Sept. 9, 1969     P. L. HILL     3,465,412

ROLL-WELD CYLINDER FABRICATION

Filed Feb. 21, 1966

INVENTOR.
PRESTON L. HILL
BY Robert O. Richardson
-ATTORNEY-

United States Patent Office 3,465,412
Patented Sept. 9, 1969

3,465,412
ROLL-WELD CYLINDER FABRICATION
Preston L. Hill, Sierra Madre, Calif., assignor, by mesne assignments, to McDonnell Douglas Corporation, Santa Monica, Calif., a corporation of Maryland
Filed Feb. 21, 1966, Ser. No. 529,146
Int. Cl. B23k 31/02
U.S. Cl. 29—423          7 Claims

ABSTRACT OF THE DISCLOSURE

A roll-weld cylinder fabrication process for the fabrication of cylinders of a heat resistant material having a high strength-to-weight ratio. Cylindrical packs are roll extruded under heat and pressure while rotating to elongate the cylinders and roll-weld reinforcing ribs to the cylinder to provide an autogenous complex cylinder structure.

---

Figure 1:
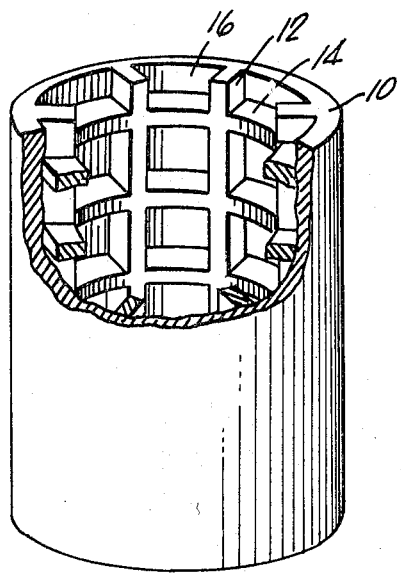

Heretofore in the fabrication of large cylindrical tanks, curved sections were fitted together and welded, leaving a longitudinal seam. In one method of fabrication, these sections were extremely thick and portions were removed to form integral ribs to give the cylinder the best possible strength-to-weight ratio. The portions of material were removed by machining or by chemical etching solutions in a process known as chemical miling. The processes were expensive and time consuming, requiring precise measuring and accurate control over the removal of excess material during the milling operations.

The cylindrical fabrication as performed by the process of the present invention results in a homogeneous cylinder with high strength-to-weight walls having no longitudinal welds. This process consists of the fabrication of outer and/or inner cylindrical walls with the desired configuration of material reinforcement formed contiguous therewith. All void area are then substantially filled with a filler material of a different kind of metal. This composite assembly is contained in a pack consisting of inner and outer cylindrical sections welded together by washer-shaped ends. This roll-weld package is adapted to be roll-extruded under heat pressure, such that the inner and outer cylindrical sections are squeezed together and thus provide for an elongated cylinder of reduced wall thickness. This roll-extrusion technique is similar to mandrel extrusion, sheer forming, spin forming or drawing, which have been used successfully in the past in making simple cylinders or bodies of revolutions having homogeneous walls. These cylinders were homogeneous structures of relatively easily formable material, such as aluminum or steel, for example. This extrusion technique, as applied to a composite roll-welded package of a material having a high heat resistance, such as titanium, for example, is performed in accordance with the process of the present invention in order to accomplish the autogenous welding of complex cylinder structures having sandwich or ribbed walls. Through use of the combination of the roll-welding techniques with the extrusion process, it is possible to achieve substantial reductions in the wall thickness of the desired cylinder and in addition provide for significant increases in length of the cylinder, while autogenously welding the complex structure into an integral part simultaneously with the extrusion operation. A complex fully wrought structure is thus obtained which has uniform metallurgical properties with no cast weld or heat affected zones.

After the fabrication of the cylinder has been achieved, the inner and outer covers are removed, as well as the washer-shaped ends of the package. Thereafter, the filler material is removed either by mechanical means, or with a chemical bath in which the chemicals are of such nature that they effect only the filler material and not the cylindrical structure material. It is through this process that it is possible to fabricate better constructed complex structured cylinders at a great saving in weight and cost.

It is therefore an object of the present invention to provide for a novel method of fabrication of cylinders.

Another object is the provision of a process of obtaining cylinders of a heat resistant material having a high strength-to-weight ratio.

Another object is the provision of a process for combining roll-welding techniques with roll-extrusion techniques to thereby fabricate a cylinder having a high strength-to-weight ratio.

Another object is the provision of a process for extruding short, thick structures into long, thin structures by combining a roll-weld process with a roll-extrusion process.

Figures 2, 3:
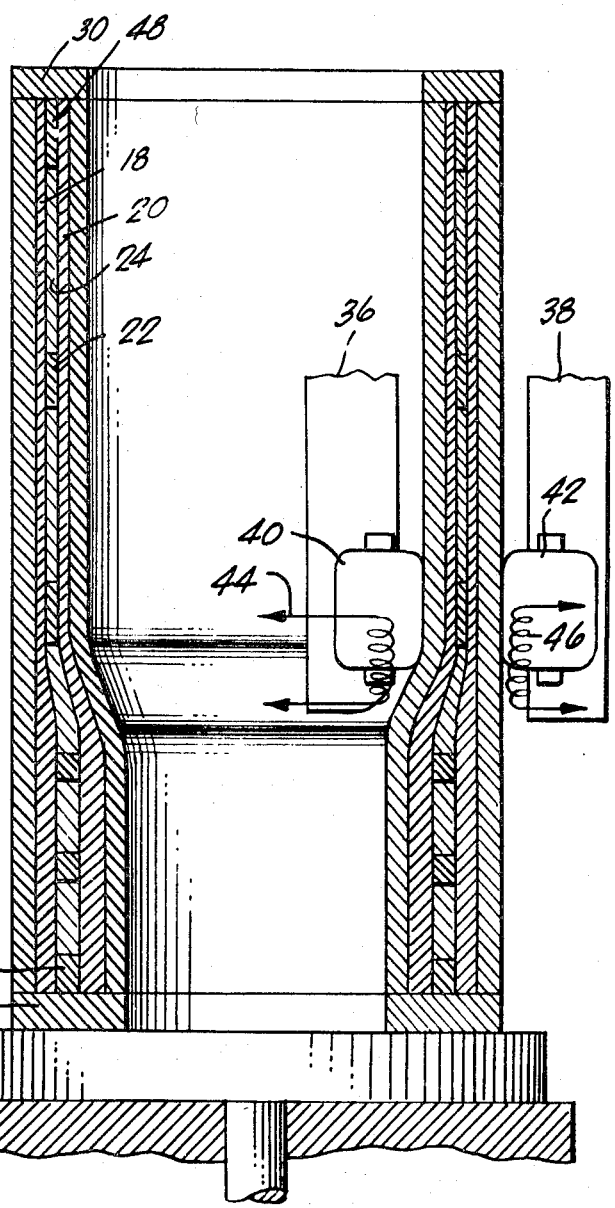

Other objects and advantages will become more apparent as a description of the present invention proceeds, now having reference to the drawings, wherein:

FIGURE 1 is a perspective view with parts broken away showing a ribbed, reinforced cylinder, made in accordance with the present invention, FIGURE 2 is a sectional view of a portion of the pack used in the fabrication of a double-walled reinforced cylinder, and FIGURE 3 is a schematic illustration of a cylindrical pack during the extrusion process.

Reference is now made to FIGURE 1 wherein there is shown an open faced cylinder 10 having integrally stiffened inwardly directed vertical ribs 12 and annular ribs 14 autogenously welded to its inner surface to form a cylinder having a high strength-to-weight ratio. The wall 16 of the cylinder 10 between these reinforcing ribs 12, 14 is of less thickness to give the cylinder its high strength-to-weight ratio. Such a construction, except with a relatively easily formable material such as aluminum or steel, has not been fabricated into an integral structure heretofore without first fabricating the cylinder of the greater thickness of wall 16 and width of rib 12, and thereafter making the walls in certain areas of a reduced thickness by chemical removal or by machining. The cylinder in FIGURE 1 is but one example of the various kinds of cylinder having ribs of many geometries that may be made in accordance with the present invention. For example, the ribs also may extend outwardly from the outer surface of the cylinder or the cylinder may have double walls with the ribs in between. The latter type is shown in FIGURE 2, assembled in a pack prior to the roll-welding with the extrusion process.

In FIGURE 2 there is shown a cylinder outer wall 18, inner wall 20 and interconnecting ribs 22. Spaced between the walls and between adjacent ribs is a filler material 24 of a material other than that of which the cylinder is to be made, it being understood that this filler material will be removed when the bonding and forming process is completed. Surrounding the cylinder is an inner wall 26, outer wall 28, upper ring 30 and lower ring 32. The inner and outer walls and upper and lower rings are sealed together such as by welding in a conventional manner, and thereafter the inside of the sealed container is evacuated or subjected to a low pressure inert gas. The preparation of a roll-weld pack is more full described in copending application Ser. No. 504,876, entitled Roll-Welded Ring Forming Process, filed Oct. 24, 1965. After the pack is completed, it is then subjected to heat and pressure, using the roll-weld techniques more fully described in the same copending application. Other information concerning the fabrication of a roll-weld pack may be had by referring to copending application Ser. No. 522,015, filed Jan. 12, 1966, for Improved Roll-Welded Structure and Process.

When the cylindrical pack is heated to the desired temperature, it is placed on a mandrel table 34, as shown in FIGURE 3, in order that it may be subjected to an extrusion process. Mandrel arms 36 and 38 are positioned so that rollers 40 and 42 engage the inner and outer surfaces of the cylindrical pack. The mandrel table 34 is then rotated and rollers 40, 42 are depressed inwardly toward each other, causing the thickness of the cylindrical pack to be reduced as shown. While rollers 40, 42 are shown, obviously one of these may be a solid mandrel, depending upon the type of machine used. Heating elements 44, 46 sustain the heat necessary while the pack is subjected to the rolling extrusion pressure. As the mandrel table is rotated, there is relative vertical movement between the table and mandrel arms 36, 38 in order to move the rollers longitudinally as well as circumferentially over the cylinder. Such a pass takes on the order of from 1 to 3 minutes and then it is repeated until the desired thickness has been achieved. As the thickness is reduced, such as on the order of three times for example, the length of the cylinder is increased proportionately. While the end ribs or rings 48, 50 are shown in rectangular cross-sectional configuration, it is to be understood that further configurations may be preferable in affecting a subsequent attachment of this cylinder to other structures. Examples of other configurations may be found in the above-mentioned copending applications. The cylinder walls may be of uniform or varying thickness and the diameter may be constant or vary longitudinally, depending upon the roll-extrusion or spinning machines used, it being contemplated that any body of revolution may be made with no subsequent longitudinal welding together of component parts thereof.

After the pack has been subjected to heat and pressure for a time sufficient to achieve diffusion bonding during the extrusion process, the supporting pack members are removed and the filler material is then removed by mechanical or chemical techniques, more fully described in copending application Ser. No. 410,971, entitled Sandwich Structures and Method, filed Nov. 13, 1964. In a double walled configuration having transverse as well as longitudinal ribs, there will be closed pockets of filler material. Access thereto, such as by drilling a hole, must be had in order to supply a chemical leachout solution to the filler material.

In addition to the advantage of fabricating a body of revolution having no longitudinal weld, the process of the present invention has another advantage in obtaining greater tolerances than the extrusion apparatus heretofore has been able to achieve. For example, suppose a particular machine is capable of obtaining a wall thickness of .750±.006″. By making a roll-weld pack in which the pack inner and outer cover plates, and the cylinder wall, are of equal thickness, the desired cylinder wall thickness of .250 will be achieved within a ±.002″ tolerance. In this example, the accuracy of the thickness of the extrusion part has been increased threefold.

Having thus described the invention, it is believed that other modifications and variations will readily become apparent to one skilled in the art, and that such deviations from the described embodiment are to be considered as part of the invention as defined by the appended claims.

What is claimed is:

1. The process of fabricating a body of revolution comprising the steps of:
    enclosing parts and structures of a selected metal to be autogenously welded thereto in abutting contact in a cylindrical pack of another material,
    subjecting said pack to suitable heat, pressure and deformation for a sufficient time to cause elongation of said pack and a reduction in the thickness of the walls of said pack, concurrently joining or welding together said parts and structures in contact therewith, and
    separating said selected metal from said another material to provide a body of revolution of selected metal and having a high strength-to-weight ratio.

2. The process as described in claim 1 wherein said body of revolution is a cylinder having reinforcing ribs extending inwardly from the inner surface thereof.

3. The process as described in claim 1 wherein the body of revolution is a cylinder having reinforcing ribs extending outwardly from the outer surface thereof.

4. The process as described in claim 1 wherein the body of revolution is a cylinder having inner and outer spaced walls with ribs spaced therebetween.

5. The process as described in claim 4 wherein filler material of other than said selected metal is positioned between said spaced walls and between ribs, thereby providing a solid substantially filled pack to be subjected to heat and pressure.

6. The process as described in claim 1 wherein said pack is placed on a rotatable mandrel table and subjected to an extrusion process under heat and pressure for reducing the thickness of said pack and effecting the elongation thereof.

7. The process as described in claim 1 wherein the tolerance in the thickness of the cylinder wall is less than the tolerance in the thickness of said pack when rollwelded and extruded with a selected extrusion machine.

References Cited
UNITED STATES PATENTS

| | | | |
|---|---|---|---|
| 1,393,564 | 10/1921 | Mills. | |
| 2,059,584 | 11/1936 | Johnson. | |
| 2,851,770 | 9/1958 | Fromson | 29—423 |
| 2,988,809 | 6/1961 | Hall | 29—423 |
| 3,044,160 | 7/1962 | Jaffee | 29—423 |
| 3,186,083 | 6/1965 | Wright | 29—494 X |
| 3,321,826 | 5/1967 | Lowy | 29—455 X |

JOHN F. CAMPBELL, Primary Examiner

J. L. CLINE, Assistant Examiner

U.S. Cl. X.R.

29—497.5